United States Patent
Koirala et al.

(10) Patent No.: US 7,936,921 B2
(45) Date of Patent: May 3, 2011

(54) EFFICIENT FIXED-POINT REAL-TIME THRESHOLDING FOR SIGNAL PROCESSING

(75) Inventors: Dipesh Koirala, Austin, TX (US); Christopher P. Thron, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1121 days.

(21) Appl. No.: 11/619,862

(22) Filed: Jan. 4, 2007

(65) Prior Publication Data

US 2008/0166046 A1  Jul. 10, 2008

(51) Int. Cl.
  *G06K 9/00* (2006.01)
  *G06K 9/34* (2006.01)
  *G06K 9/38* (2006.01)

(52) U.S. Cl. .................. 382/172; 382/168; 382/171

(58) Field of Classification Search .......... 382/168, 382/171–173
See application file for complete search history.

(56) References Cited

U.S. PATENT DOCUMENTS

| | | | | |
|---|---|---|---|---|
| 5,546,328 A * | 8/1996 | Kiridena et al. | ............... | 700/279 |
| 5,608,851 A * | 3/1997 | Kobayashi | ............... | 345/591 |
| 5,909,244 A * | 6/1999 | Waxman et al. | ............... | 348/222.1 |
| 6,064,773 A * | 5/2000 | Yamagata | ............... | 382/237 |
| 7,030,880 B2 * | 4/2006 | Tanioka et al. | ............... | 345/427 |
| 7,298,897 B1 * | 11/2007 | Dominguez et al. | ............... | 382/172 |
| 7,574,046 B2 * | 8/2009 | Ichimura et al. | ............... | 382/181 |
| 2005/0232506 A1 * | 10/2005 | Smith et al. | ............... | 382/254 |

OTHER PUBLICATIONS

Otsu, Nobuyuki "A threshold selection method from gray-level histograms". IEEE Trans. Sys., Man., Cyber. 9: 62-66.*
Xue Dong Yang; Gupta, V.; "An improved threshold selection method for image segmentation", Canadian Conference on Electrical and Computer Engineering, 1993. Sep. 14-17, 1993 pp. 531-534 vol. 1.*
Ku Chin Lin; "On the statistical and computational performance of image thresholding and determination of class number", IECON 02 [Industrial Electronics Society, IEEE 2002 28th Annual Conference of the] vol. 3, Nov. 5-8, 2002 pp. 2179-2184.*
Paulo Sergio Ramirez Diniz, Eduardo Antônio Barros Da Silva, Sergio Lima Netto "Digital signal processing: system analysis and design", 2002, chapter 7, Finite-precision effects, p. 310.*

* cited by examiner

*Primary Examiner* — Samir A Ahmed
*Assistant Examiner* — Li Liu
(74) *Attorney, Agent, or Firm* — Dillon & Yudell LLP

(57) ABSTRACT

A method for efficiently calculating signal thresholds for use in signal processing is described. The method computes and stores a cumulative histogram and a weighted cumulative histogram. The method then provides a first estimate for a threshold based on a single ratio. The method next performs an iterative computation to get to the ultimate threshold result. Method iterations only require multiplication and addition operations on the stored values making the method well suited for implementation in fixed-point digital signal processors.

19 Claims, 4 Drawing Sheets

EFFICIENT FIXED-POINT REAL-TIME THRESHOLDING FOR SIGNAL PROCESSING

BACKGROUND OF THE INVENTION

1. Field of the Invention

The invention relates generally to signal processing, and particularly to a method for efficiently calculating thresholds.

2. Description of the Related Art

Thresholding is a technique utilized in signal processing to identify and remove noise from the signal. There exists a variety of methods to perform thresholding on signals. One of the most common techniques is the Otsu method.

The Otsu method is a common thresholding method that is used in a wide array of areas such as noise reduction for human action detection, image segmentation based on lumen values, and segmentation of images with complex backgrounds. Otsu provided an algorithm that could be utilized to generate a threshold based on maximizing the variance between classes. The basic Otsu computation involves complex arithmetic operations such multiplications and divisions. Use of division does not pen-nit the implementation in high-speed low-cost hardware.

Building upon the Otsu method, Ku Chin Lin, in his paper "On improvement of the computation speed of Otsu's image threshold" Journal of Electronic Imaging 14(2), 023011 (April-June 2005), simplified the process by utilizing the derivative of the Otsu's mathematical formula. Additionally, the Lin method reduced the number of iterations required to find the threshold. While Lin's approach simplified the mathematical computation in each step, it still requires the use of division operations that make it impractical for implementation on low-cost digital signal processors.

All existing implementations of the Otsu method require the use of divides, which are resource-costly and require higher precision. Further, these implementations are not feasible for fixed-point digital signal processors for performing real-time processing of video data. Therefore, there exists a need for an improved method of calculating a threshold that does not require the use of divides.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration of specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, but it is to be understood that other embodiments may be utilized and that logical, architectural, programmatic, mechanical, electrical and other changes may be made without departing from the spirit or scope of the present invention. Further, elements or steps, or combinations thereof that produce equivalent results as those described below may be utilized without departing from the scope of the invention. The following detailed description is, therefore, not to be taken in a limiting sense, and the scope of the present invention is defined only by the appended claims and their equivalents.

Figure 1:
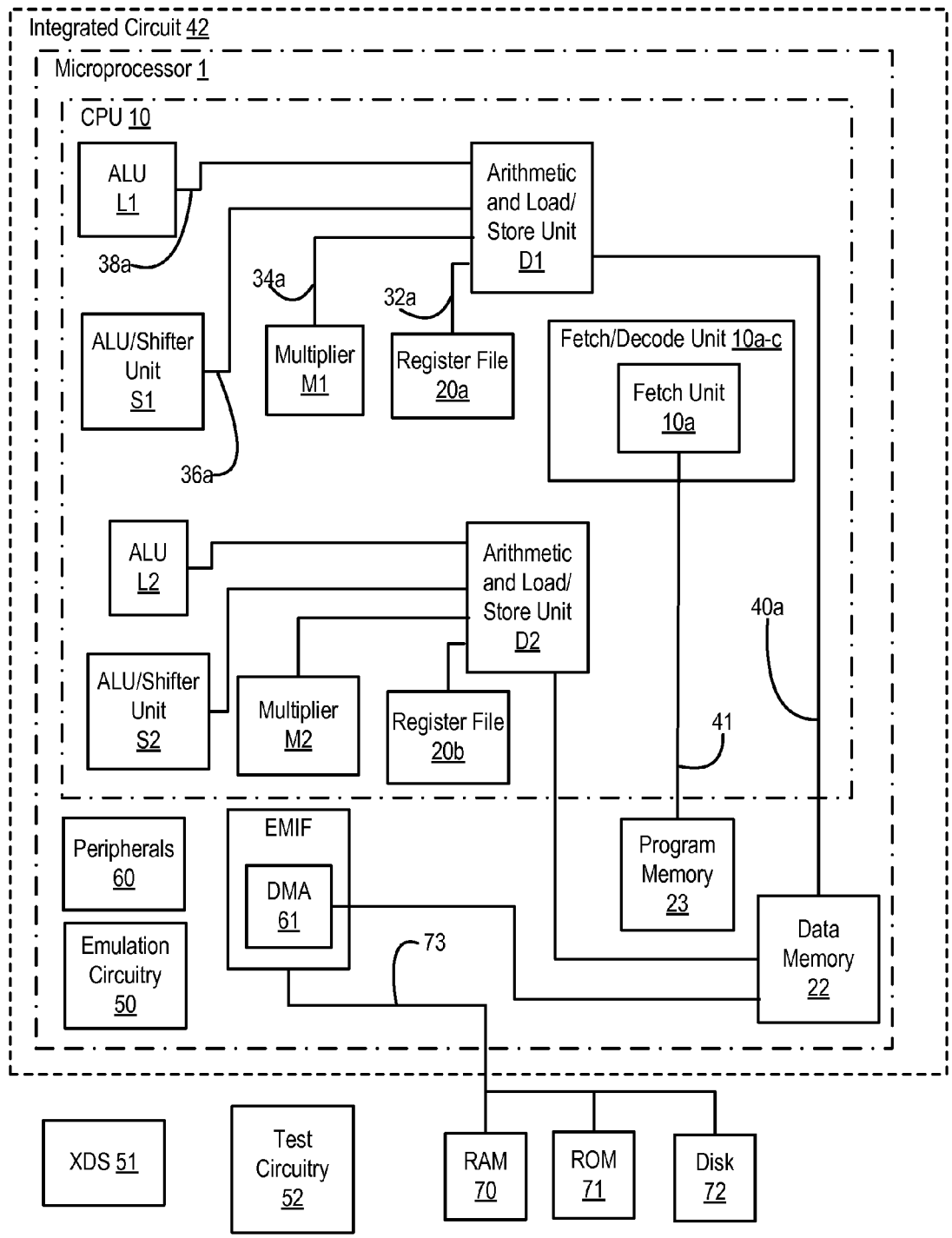
FIG. 1 illustrates a digital signal processor implementing the present invention.

With reference now to the figures, and in particular with reference to FIG. 1 there is depicted a block diagram of a microprocessor 1, which is used in one embodiment of the present invention. Microprocessor 1 is a digital signal processor ("DSP"). The DSP illustrated in FIG. 1 is by way of example only, as the present invention may be implemented on other DSP configurations. Details of general construction for DSPs are well known, and may be found readily elsewhere. For example, U.S. Pat. No. 5,072,418 issued to Frederick Boutaud et al., describes a DSP in detail and is incorporated herein by reference. U.S. Pat. No. 5,329,471 issued to Gary Swoboda et al., describes in detail how to test and emulate a DSP and is incorporated herein by reference.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a-c, a plurality of execution units, including an arithmetic and load/store unit D1, a multiplier M1, an ALU/shifter unit S1, an arithmetic logic unit ("ALU") L1, a shared multi-port register file 20a from which data are read and to which data are written. Instructions are fetched by fetch unit 10a from instruction memory 23 over a set of busses 41. Decoded instructions are provided from the instruction fetch/decode unit 10a-c to the functional units D1, M1, S1, and L1 over various sets of control lines which are not shown. Data are provided to/from the register file 20a from/to load/store unit D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store unit D1 via a fifth set of busses 40a. Note that the entire data path described above is duplicated with register file 20b and execution units D2, M2, S2, and L2. Load/store unit D2 similarly interfaces with memory 22 via a second set of busses. Instructions are fetched by fetch unit 10a from instruction memory 23 over a set of busses 41. Emulation circuitry 50 provides access to the internal operation of integrated circuit 1 which may controlled by an external test/development system (XDS) 51.

External test system 51 is representative of a variety of known test systems for debugging and emulating integrated circuits. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22-23 may just as well be external to the microprocessor 1 integrated circuit 42, or part of it may reside on the integrated circuit 42 and part of it be external to the integrated circuit 42.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller part of functional block 61 connects to data memory 22 via a bus and is generally used to move data between memory and peripherals within microprocessor 1 and memory and peripherals which are external to microprocessor 1.

Figure 2:
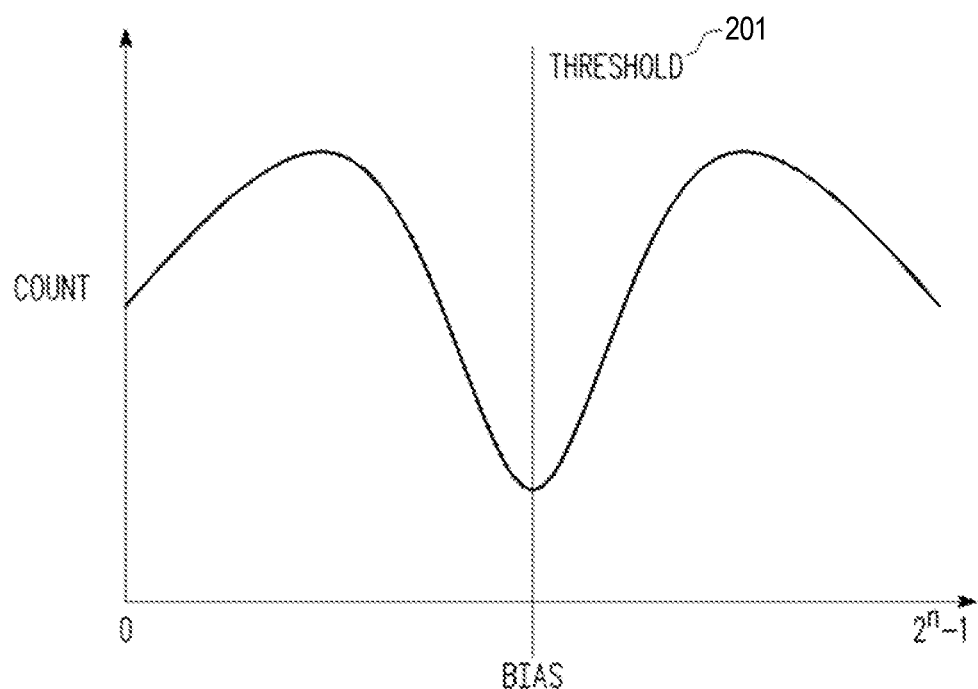
FIG. 2 and FIG. 3 depict graphs representing an ideal and realistic signal distribution, respectively.
Figure 3:
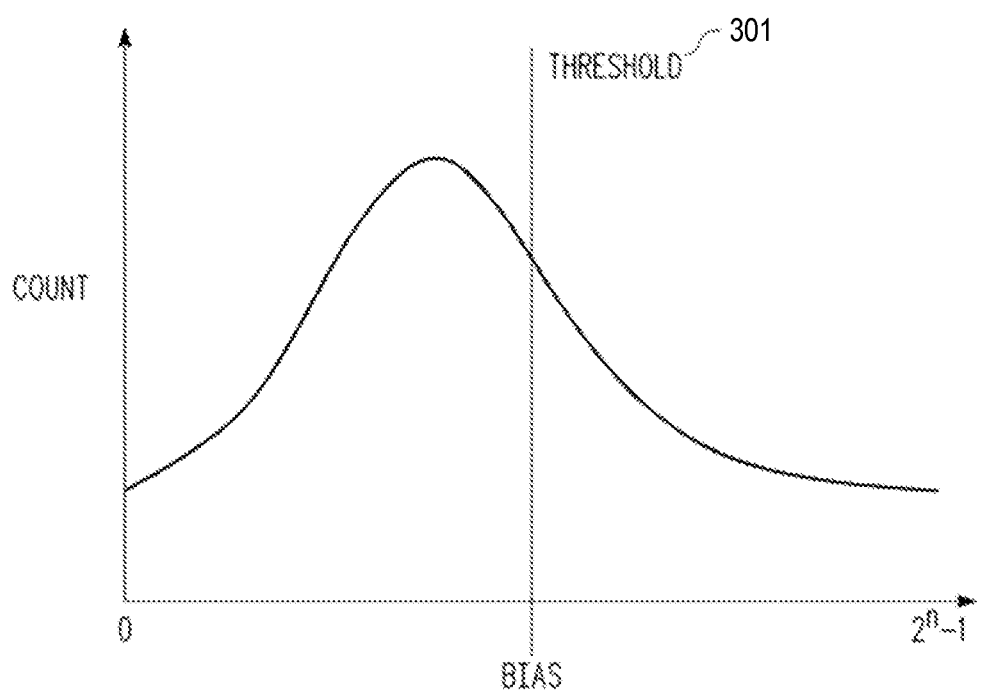

With reference now to FIG. 2 and FIG. 3, there are shown graphical representations of signal histograms. More specifically, the figures depict histogram representations of video images that have an intensity level between 0 and $2^n-1$. The Y axis of FIG. 2 and FIG. 3 represent the count, or number of pixels in the video image that have an intensity that corresponds to the bin number on the X axis.

The video signal is a frame of video consisting of luma and chroma components. The signal provides the intensity value representing the strength of the signal for the luma and chroma components. The use of a video signal is for example only. The present invention could be used on other types of signals, including audio.

One advantage of the present invention is that is works without the use of divide instructions to calculate the value for the object function. In reference hereto, the term divide does not include mathematical divisions that are accomplished with shift operations. A value in a DSP may be divided and multiplied by 2 (or any power of 2) by the use of a shift operation.

FIG. 2 represents an ideal histogram for a video signal. The pixels of the image are easily classified into two groupings. One grouping represents noise or other unimportant elements of the signal or elements of the signal that will be analyzed separately from the other group and the other grouping represents elements of the image that merit further attention. Threshold 201 represents a value that is utilized to classify intensity values into one of these two categories.

FIG. 3 illustrates a signal histogram for a signal that is likely to be observed in the real world. When compared to FIG. 2, it is evident that signal in FIG. 3 does not contain two easily distinguishable classes of pixels. Threshold 301 represents the optimum threshold as determined by the method of the present invention. As with FIG. 2, Threshold 301 classifies the image pixels as important or as noise.

Once a threshold has been obtained for a signal, subsequent processing on the signal utilizes the threshold value to determine which elements of the signal merit further attention. If for example the background of an image is of interest, then the pixels which do not surpass the threshold may be selected for farther analysis; while if the foreground is of interest then the pixels which surpass the threshold may be selected.

FIG. 2 and FIG. 3 are meant as examples only for illustrating the purpose of thresholds in signal processing, and do not limit the use or application of the invention to other types of signals.

Figure 4:
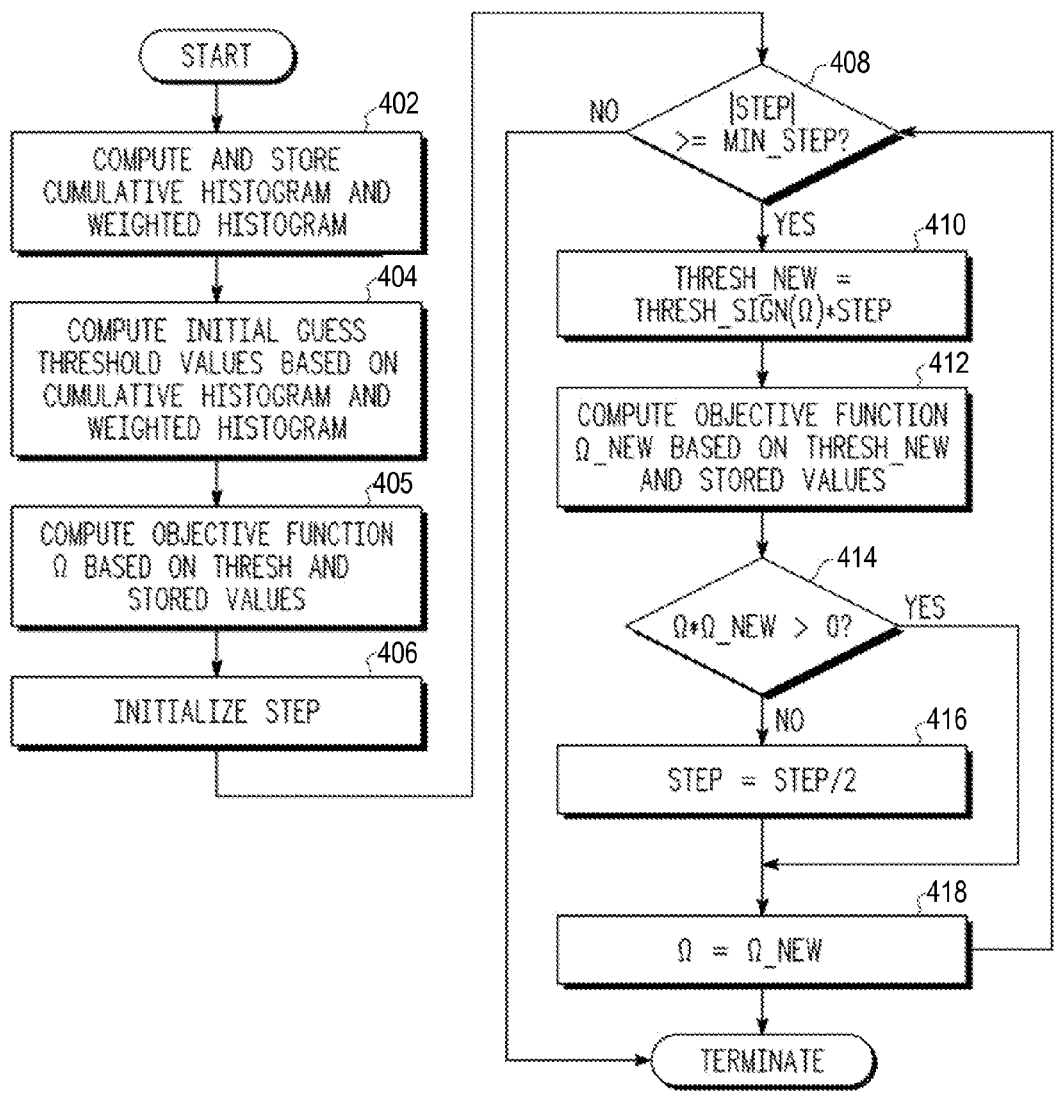
FIG. 4 illustrates a flow diagram for performing the method of the present invention for determining the threshold for a bi-modal signal.

With reference now to FIG. 4, a flow diagram for performing the method of the present invention for determining the threshold for a bi-modal signal is depicted. A bi-modal signal is a signal with two identifiable maximums in the region of interest.

The method begins at Step 402 where a cumulative and weighted histogram are calculated and stored. A cumulative histogram is a histogram where each bin (which is an intensity value) contains the number of pixels with intensity value less than a given intensity value for that bin. A weighted histogram is the cumulative histogram of the weighted sum (i.e number of pixels per bin in the cumulative histogram X intensity value of the bin).

After calculating the histograms, the process advances to Step 404. At Step 404, an initial estimate is calculated based on the histograms from Step 402. In a preferred embodiment, the initial estimate threshold is calculated as $(2\mu+K_{max})/2$ (this high initial estimate can be generated without dividing by performing an arithmetic shift to the right), where $K_{max}$ is the number of bins in the weighted histogram, and $\mu$ is the total mean of the weighted histogram. In other embodiments, the initial estimate threshold is $K_{max}$, where $K_{max}$ is the number of bins in the weighted histogram.

At Step 405, an objective function value based on the initial estimate threshold and histograms is computed. The objective function is calculated as follows:

$$A1=N-N(k)$$

$$A2=M \cdot N(k)$$

$$B1=(k \cdot A1+M(k))$$

$$B2=N \cdot M(k)+A2$$

$$C1=2 \cdot N(k) \cdot B1-B2$$

where:
$N(k)=k^{th}$ cumulative histogram
$M(k)=k^{th}$ weighted cumulative histogram
C1 is the result of the objective function
$(2\mu+K_{max})/2$ is the initial estimate threshold In a preferred embodiment, the A1 and A2 values are computed parallel as are the B1 and B2 values. By calculating the values in parallel, the objective function is computed in approximately 3 cycles. Further, since the calculation for the objective function does not involve any costly division operations, the computation is faster and more accurate than other methods in the prior art. In other embodiments, the values for A1, A2, B1, B2, and C1 are calculated in order.

Having a cumulative histogram, a weighted histogram, and an initial estimate, the method advances to Step 406. At Step 406, an initial step value is calculated. The step value is used to adjust the current estimate threshold value and quickly converge it to the optimal threshold. In a preferred embodiment the step value is calculated as ½ of the previous step size. The first step size used can be based on empirical results from previous runs or can be set arbitrarily. In any case the max first step size is always less than number of bins in the histogram, step size that takes the threshold to a value outside the number of bins is bound to within the number of bins.

Step 408 marks the beginning of the convergence loop. The convergence loop executes while the absolute value of the step value is greater than or equal to a minimum step value and comprises of Steps 408-418.

At Step 408, the absolute value of the step value is compared to a minimum step value. If the absolute value of the current step value is less than the minimum step value, the convergence loop terminates. The minimum step value is adjustable to accommodate different levels of accuracy. If the required accuracy for the threshold is within +/−2 of the actual threshold then the minimum threshold can be set to 2, so for accuracy requirement of +/−x the minimum step size is set to x.

A new threshold estimate is computed at Step 410. The new threshold estimate is calculated as $threshold_{new}=threshold_{previous}-(\text{sign of objective function})*$ (step size). The sign of the objective function determines if the objective function is positive or negative and is used to adjust the step direction.

Decision Step 414 determines if the new objective function multiplied by the previous objective function is greater than zero. The purpose of this comparison is to determine if the optimal threshold value lies between threshold$_{new}$ and threshold$_{previous}$. If this is the case then the step size is cut in half and the next step is taken in the opposite direction at Step 416. Otherwise the Step at 416 is skipped and the process moves to Step 418.

At Step 418, a current objective function value is set to the new objective value function value computed at Step 412. The process returns to the beginning of the loop at Step 408.

Upon termination of the convergence loop, the threshold value is calculated and may be used in performing further signal analysis.

Figure 5:
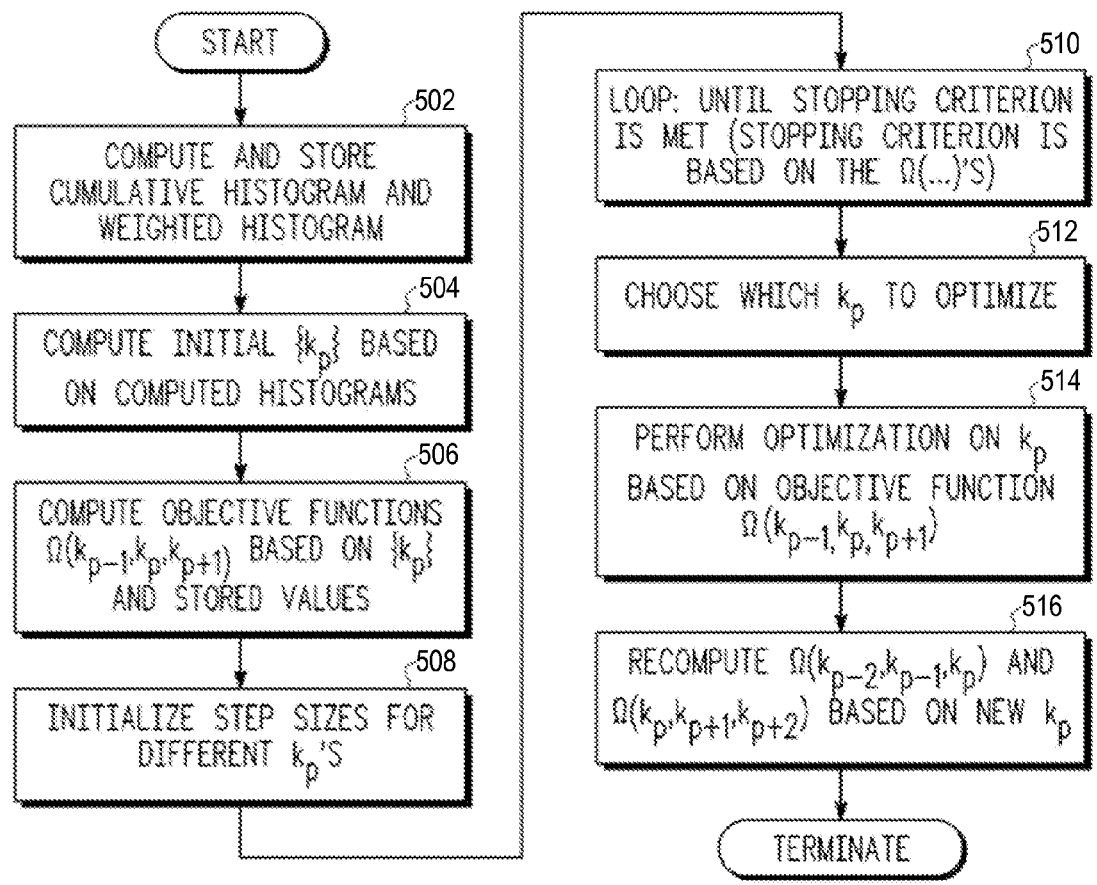
FIG. 5 shows a flow diagram for multi-threshold signal processing in accordance with the method of the present invention.

With reference now to FIG. 5, a flow diagram for multi-threshold signal processing in accordance with the method of the present invention is illustrated.

The method begins at Step 502 where a cumulative and weighted histogram are calculated and stored. The weighted and cumulative histograms are calculated in the same manner as described with Step 402 in FIG. 4.

After calculating the histograms, the process advances to Step 504. At Step 504, a set of initial estimate thresholds is calculated based on the histograms from Step 502. In a preferred embodiment, the initial estimate thresholds are calculated by using equally spaced initial thresholds. In another embodiment, the initial estimate thresholds are calculated by locating the averaged histogram minima and placing thresholds between these values.

At Step 506, a set of objective function values based on the set of initial estimate threshold and histograms is computed. The objective function values are calculated in the same manner as described in Step 405.

Having a cumulative histogram, a weighted histogram, and a set of initial estimate thresholds, the method advances to Step 508. At Step 508, an initial step value is calculated. The step value is used to adjust the current estimate threshold value and quickly converge it to the optimal threshold.

Step 510 marks the beginning of the convergence loop. The convergence loop executes while the absolute value of the step value is greater than or equal to a minimum step value for each of the thresholds and comprises of Steps 510-516. In another embodiment, the loop criterion verifies that the loop count has not exceeded a maximum value.

At Step 510, the absolute value of the step value is compared to a minimum step value for each of the thresholds. If the absolute value of the current step value is less than the minimum step value for each of the thresholds, the convergence loop terminates.

At Step 512, a threshold is chosen for optimization. In a preferred embodiment, the chosen threshold is the threshold with the maximum objective function value. In other embodiments, the thresholds are chosen in order, by alternating even and odd thresholds, or by random choice.

The threshold chosen at Step 512 is optimized at Step 514. The optimization of the chosen threshold is done in accordance with the method described in FIG. 4, Steps 408-418.

After the chosen threshold is optimized, the process advances to Step 416 where the objective function is recomputed based on the optimized threshold value from Step 414. The process then returns the start of the convergence loop at Step 410.

Upon termination of the convergence loop, the threshold values are calculated and may be used in performing further signal analysis.

As will be appreciated, the processes in preferred embodiments of the present invention may be implemented using any combination of computer programming software, firmware or hardware. The method form of the invention may be practiced by combining software and/or hardware to complete the steps of the invention.

Accordingly, the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A fixed-point digital signal processor, comprising:
a processing unit;
a computer readable medium coupled to the processing unit; and
program code within the computer readable medium that when executed by the processing unit causes the fixed-point digital signal processor to perform:
calculating a cumulative histogram of a signal;
calculating a weighted histogram of the signal;
calculating an objective function value without using divides, wherein calculating the objective function value without using divides comprises:
calculating N−N(k) as a first value, wherein N is the cumulative histogram and N(k) is a $k^{th}$ cumulative histogram;
calculating M·N(k) as a second value, wherein M is the weighted histogram and N(k) is the $k^{th}$ cumulative histogram;
calculating (k·A1+M(k)) as a third value, wherein A1 is the first value and M(k) is a $k^{th}$ weighted cumulative histogram;
calculating N·M(k)+A2 as a fourth value, wherein N is the cumulative histogram, M(k) is the $k^{th}$ weighted cumulative histogram, and A2 is the second value; and
calculating 2·N(k)·B1−B2 as the objective function value, wherein B1 is the third value, B2 is the fourth value, and N(k) is the $k^{th}$ cumulative histogram;
determining an initial estimate threshold value;
calculating a threshold; and
analyzing the signal with the threshold.

2. The fixed-point digital signal processor of claim 1, where the signal is a video signal.

3. The fixed-point digital signal processor of claim 1, wherein calculating the threshold comprises:
determining a step value;

determining that an absolute value of the step value is greater than a minimum step value;
calculating a new estimate threshold value; and
calculating a new objective function value based on the new estimate threshold value.

4. The fixed-point digital signal processor of claim 3, wherein the program code within the computer readable medium that when executed by the processing unit causes the fixed-point digital signal processor to further perform:
adjusting the step value if the objective function value multiplied by the new objective function value is less than zero.

5. The fixed-point digital signal processor of claim 3, wherein the new estimate threshold value is calculated as T1−Sign(Ω)·Step, wherein T1 is the threshold value, Ω is the objective function value, Sign(Ω) is −1 if Ω<0 and is 1 otherwise, and Step is the step value.

6. The fixed-point digital signal processor of claim 1, wherein the initial estimate threshold value is determined as $(2\mu+K_{max})/2$, wherein $K_{max}$ is a number of bins in the weighted histogram and $\mu$ is a total mean of the weighted histogram.

7. The fixed-point digital signal processor of claim 1, wherein the initial estimate threshold value is determined as $K_{max}$, wherein $K_{max}$ is a number of bins in the weighted histogram.

8. A method for determining a threshold of a signal, comprising:
calculating a cumulative histogram of the signal;
calculating a weighted histogram of the signal;
calculating an objective function value, wherein calculating the objective function value comprises:
calculating N−N(k) as a first value, wherein N is the cumulative histogram and N(k) is a $k^{th}$ cumulative histogram;
calculating M·N(k) as a second value, wherein M is the weighted histogram and N(k) is the $k^{th}$ cumulative histogram;
calculating (k·A1+M(k)) as a third value, wherein A1 is the first value and M(k) is a $k^{th}$ weighted cumulative histogram;
calculating N·M(k)+A2 as a fourth value, wherein N is the cumulative histogram, M(k) is the $k^{th}$ weighted cumulative histogram, and A2 is the second value; and
calculating 2·N(k)·B1−B2 as the objective function value, wherein B1 is the third value, B2 is the fourth value, and N(k) is the $k^{th}$ cumulative histogram;
determining an initial estimate threshold value;
calculating the threshold; and
analyzing the signal with a threshold.

9. The method of claim 8, wherein calculating the threshold comprises:
determining a step value;
determining that an absolute value of the step value is greater than a minimum step value;
calculating a new estimate threshold value; and
calculating a new objective function value based on the new estimate threshold value.

10. The method of claim 9, further comprising:
adjusting the step value if the objective function value multiplied by the new objective function value is less than zero.

11. The method of claim 9, wherein the new estimate threshold value is calculated as T1−Sign(Ω)·Step, wherein T1 is the threshold value, Ω is the objective function value, Sign(Ω) is −1 if Ω<0 and is 1 otherwise, and Step is the step value.

12. The method of claim 8, wherein the initial estimate threshold value is determined as $(2\mu+K_{max})/2$, wherein $K_{max}$ is the number of bins in the weighted histogram and $\mu$ is a total mean of the weighted histogram.

13. The method of claim 8, wherein the initial estimate threshold value is determined as $K_{max}$, wherein $K_{max}$ is a number of bins in the weighted histogram.

14. A program product comprising:
a non-transitory computer readable memory medium; and
program code within the non-transitory computer readable memory medium that when executed by a data processing system causes the data processing system to perform:
calculating a cumulative histogram of the signal;
calculating a weighted histogram of the signal;
calculating an objective function value, wherein calculating the objective function value comprises:
calculating N−N(k) as a first value, wherein N is the cumulative histogram and N(k) is a $k^{th}$ cumulative histogram;
calculating M·N(k) as a second value, wherein M is the weighted histogram and N(k) is the $k^{th}$ cumulative histogram;
calculating (k·A1+M(k)) as a third value, wherein A1 is the first value and M(k) is a $k^{th}$ weighted cumulative histogram;
calculating N·M(k)+A2 as a fourth value, wherein N is the cumulative histogram, M(k) is the $k^{th}$ weighted cumulative histogram, and A2 is the second value; and
calculating 2·N(k)·B1−B2 as the objective function value, wherein B1 is the third value, B2 is the fourth value, and N(k) is the $k^{th}$ cumulative histogram;
determining an initial estimate threshold value;
determining a threshold value; and
analyzing the signal with a threshold.

15. The program product of claim 14, wherein determining the threshold comprises:
determining a step size for each threshold in the set of threshold values;
determining that a minimum step size is less than or equal to 1 or that a maximum number of iterations has been exceeded;
selecting the threshold value from a set of threshold values to optimize; and
optimizing the threshold value.

16. The program product of claim 15, wherein optimizing the selected threshold value comprises:
calculating a new estimate threshold value for the threshold value from the set of threshold values to optimize; and
calculating a new objective function value based on the new estimate threshold value.

17. The program product of claim 15, wherein selecting the threshold value comprises:
selecting the threshold value associated with a maximum objective function value.

18. The program product of claim 15, wherein selecting the threshold value comprises:
selecting the threshold value at random from the set of threshold values to optimize.

19. The program product of claim 14, wherein the initial estimate threshold value is determined as $(2\mu+K_{max})/2$, wherein $K_{max}$ is the number of bins in the weighted histogram and $\mu$ is a total mean of the weighted histogram.

* * * * *